(12) United States Patent
Haney

(10) Patent No.: US 10,949,487 B2
(45) Date of Patent: Mar. 16, 2021

(54) SYSTEMS AND METHODS FOR ACCESSING COMPUTING DEVICE RESOURCES

(71) Applicant: HYLAND SWITZERLAND SÀRL, Geneva (CH)

(72) Inventor: Kristopher John Andrew Haney, Olathe, KS (US)

(73) Assignee: HYLAND SWITZERLAND SÀRL, Geneva (CH)

(*) Notice: Subject to any disclaimer, the term of this patent is extended or adjusted under 35 U.S.C. 154(b) by 358 days.

(21) Appl. No.: 15/134,213

(22) Filed: Apr. 20, 2016

(65) Prior Publication Data

US 2016/0308956 A1    Oct. 20, 2016

Related U.S. Application Data

(60) Provisional application No. 62/150,186, filed on Apr. 20, 2015.

(51) Int. Cl.
*G06F 15/16* (2006.01)
*G06F 16/957* (2019.01)

(52) U.S. Cl.
CPC .................. *G06F 16/957* (2019.01)

(58) Field of Classification Search
CPC .............. H04W 76/10; H04W 56/001; H04L 29/06326; H04L 67/1002; H04L 67/32; G06F 17/30899
USPC .................. 709/227, 248, 229, 212
See application file for complete search history.

(56) References Cited

U.S. PATENT DOCUMENTS

| 8,745,018 | B1* | 6/2014 | Singleton | G06F 3/048 707/705 |
| 9,280,677 | B1* | 3/2016 | Perry | G06F 21/6218 |
| 9,294,538 | B1* | 3/2016 | Rana | G06F 9/45529 |
| 9,760,697 | B1* | 9/2017 | Walker | G06F 21/31 |
| 2011/0138059 | A1* | 6/2011 | Schleifer | G06F 9/541 709/227 |
| 2013/0325960 | A1* | 12/2013 | Agarwal | H04L 65/40 709/204 |
| 2014/0115606 | A1* | 4/2014 | Hamzata | G06F 9/46 719/313 |
| 2014/0280694 | A1* | 9/2014 | Bilange | H04L 67/02 709/217 |
| 2015/0324479 | A1* | 11/2015 | Seidle, Jr. | H04L 67/02 715/234 |

* cited by examiner

*Primary Examiner* — Kaylee J Huang
(74) *Attorney, Agent, or Firm* — Medley, Behrens & Lewis, LLC

(57) ABSTRACT

A method of accessing a computing device resource includes loading a web application into a web browser running on a computing device; determining, by the web application, whether a native application is active on the computing device; and if the native application is active, establishing a connection between the web application and a native application; and receiving information about the computing device resource through the native application.

20 Claims, 6 Drawing Sheets

SYSTEMS AND METHODS FOR ACCESSING COMPUTING DEVICE RESOURCES

CROSS REFERENCE TO RELATED APPLICATIONS

The present application is related to and claims priority from U.S. provisional patent application 62/150,186, filed Apr. 20, 2015, entitled, "Systems and Methods for Accessing Computing Device Resources," the content of which is incorporated by reference herein its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to extending browser functionality, and more particularly, to enabling browsers to provide automated access to one or more resources associated with an event detected on an application local to a user's computing device.

2. Description of the Related Art

A browser's core functionality is to request, receive, and render resources such as web pages for users to view. Albeit a web browser's functionality is tied up with presenting web resources as decipherable information, the web browser can be adjusted so that other operations can be performed thereon and thus extending its basic functionality. Modifying the browser may require users to dive deep into its configuration settings or simply install existing add-ons already available in the market.

What modifications are to be made to a browser's capabilities generally depend on what function one wants the browser to perform besides displaying web pages. Known systems or methods for extending a browser's functionality involve the addition of plug-ins, bookmarklets, and browser extensions. However, in the context of enterprise applications, each of these systems presents their respective disadvantages.

For instance, an operation that a plug-in can perform is page-specific or site-specific and typically requires user permission. A plug-in may be able to, for example, allow users to perform searches on content highlighted by a user on a web page, when permitted by the user. Bookmarklets, on one hand, enable functions to be performed on several web pages yet relies on a user's click. Prior to incorporating browser extensions to a browser, several things must be identified and considered such as the browser's platform and the availability of support in the market. Further, there may be a need for browser extensions—plug-ins and bookmarklets as well—to be continuously updated and configured each time a browser is updated to a newer version. As such, while browser extensions are pervasive and independent of user activation or permission (unlike plug-ins and bookmarklets), different versions of browser extensions still need to be developed and maintained for each type and version of a browser.

Existing enterprise applications require users to sift through records for use by one or more applications. Enterprise applications often involve different applications in different platforms (i.e., desktop or web-based) such that users are required to navigate from one application to another to retrieve resources—text documents, images, and associated metadata—that may be used by other applications. Therefore, retrieving resources from different applications and associated databases or storage systems is time-consuming and requires effort.

Accordingly, there is a need for a system for synchronizing information present among applications involved in an enterprise for automated viewing and accessing of users. As browsers play a role in requesting, rendering, and retrieving resources, the need further extends to adding functionality to the browser to provide automated access to resources associated with events detected on the computing device and/or to access a local operating system.

SUMMARY

Systems and methods for accessing computing device resources are disclosed. The system includes a web browser having at least one application running thereon, a computing device having at least one native application, and a background service or application component establishing a connection between the native and browser applications. Executable code is loaded on to the computing device to establish the connection, thereby at least allowing the browser applications to access resources in the computing device memory.

In one example embodiment, a method of accessing a computing device resource includes loading a web application into a web browser running on the computing device; determining, by the web application, whether a native application is active on the computing device; and if the native application is active, establishing a connection between the web application and the native application; and receiving information about the computing device resource through the native application. The native application may be an application running in the background of the computing device.

In another example embodiment, a method of syncing events between a native application and a browser application includes loading a background service on a computing device, the background service being communicatively connected with a browser application running on a web browser of the computing device and one or more applications native to the computing device; receiving, by one of the browser application and the one or more applications, a message from the background service indicative of an event on the other; and performing one or more operations associated with the event. The one or more operations may include obtaining one or more resources stored in a corresponding storage mechanism and associated with the event.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
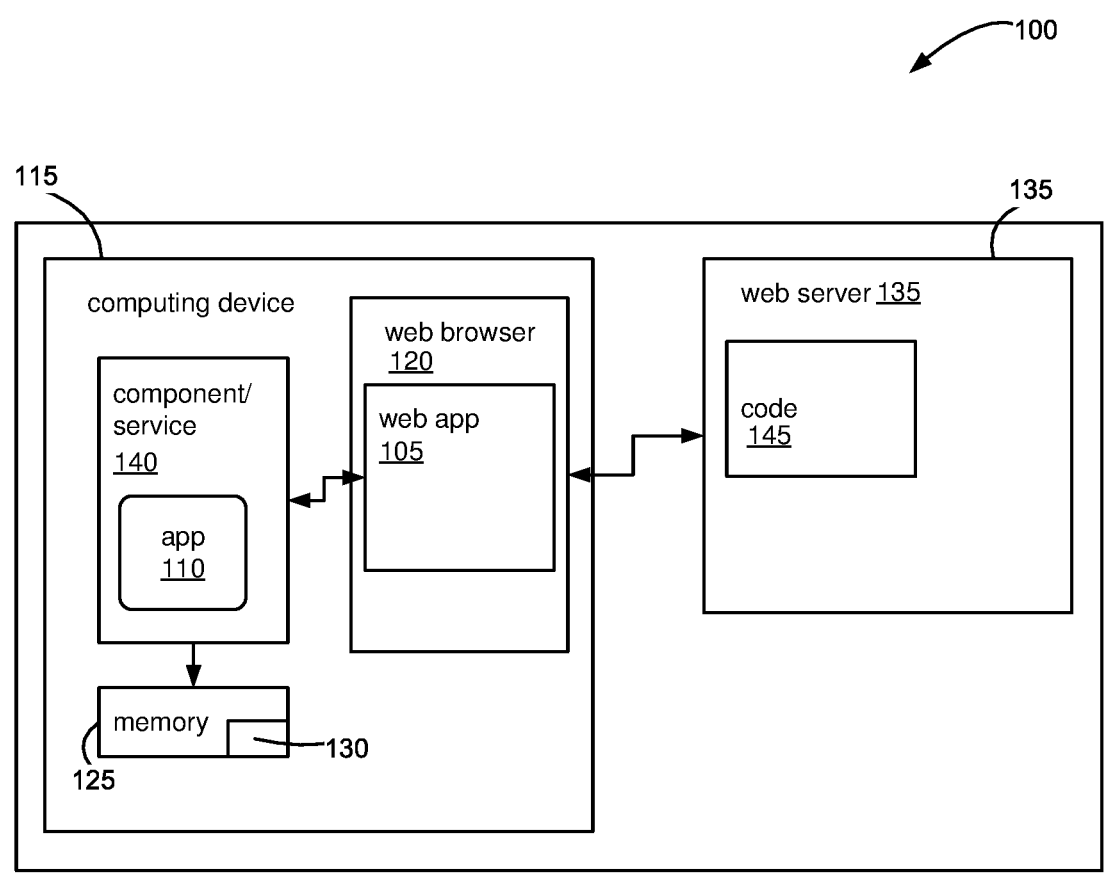
FIG. 1 shows a block diagram of one example embodiment of a system of presenting resources related to application events on a web browser application.

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the descriptions below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the function specified in the block or blocks.

Accordingly, the blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are a system and methods of providing automated access to one or more resources associated with one or more events detected on at least one native application on a computing device. A native or local application is any application operative to be executed in the background of the user's computing device. An application component may be installed on a user's computing device for running as a connection between the native or local application and a browser-based or web application. The browser-based application may be any web application that runs within an environment of a web browser. In retrieving resources, the browser-based application is operative to communicate with one or more remote storage mechanisms. Using the application component, the web browser is operative to communicate or connect with an operating system of the computing device and perform functions typically performed by native or locally-installed applications (e.g., storing data, writing to disk, etc.). Alternatively, upon establishment of the application component, any event on predetermined native applications may be relayed to the browser-based application, as will be discussed in detail below.

For purposes of the present disclosure, an event may be one or more activities in any native or locally-installed application. An event may also refer to any activity performed in a web browser executing on the computing device having a connection with the native application, as will be discussed in greater detail below. An event may be, for example, a user-generated action, such as the clicking or depressing of a button, entering of characters, selection on a form, opening a document, clicking of a link, and the like. An event may also be an occurrence on the application and/or the system on which the application is executing, such as, for example, a decrease in memory, a change in system or application state, a delay in an operating system process, an error in a request for network communication (i.e., dropped network connection) or for communication with a particular native application, or detection of an additional user accessing the computing device. An event may be triggered by another event. For example, the event may be a user action, an error notification, a completion of a long running action, a response received from a server or database, a file closed, or an operating system notification received, among others.

A resource may refer to any data stored on a computer-readable storage medium. A resource may be stored locally on a memory of a computing device or in a storage mechanism remote to the computing device such as in a database server over a network. A resource may be a file of any format such as a text document, an image, an audio file, video, or multimedia presentation, a list of configuration settings, a source code, and the like. As will be known in the art, a resource may also include associated metadata that identifies at least, for example, its file format and provides a summary of its content or context. In another aspect, a resource may include general information about the computing device, for example, a file system of the computing device, a list of processes currently executing or is operative to run on the computing device, a state of application processes in the computing device, a list of users logged in to the computing device, and like information. In yet another aspect, a resources may be data indicative of an event occurring or that will occur on the computing device.

FIG. 1 shows a block diagram of one example embodiment of a system 100 for providing automated access to resources between a browser-based web application 105 and one or more native applications (illustrated collectively as native application 110) both for running on a computing device 115. Browser-based application 105 is configured to be executed on a web browser 120. Besides browser-based application 105, native application 110, and web browser 120, other applications may be installed and executed on computing device 115. Computing device 115 further includes a memory 125 which may be any tangible, computer-readable storage medium for storing a plurality of resources (labeled local resources 130) on computing device 115. The plurality of resources may include configuration settings of native application 110, documents stored and associated to users thereof, and other system-related data apparent in the art.

Browser-based or web application 105 may be any application for running on a web browser (e.g., web browser 120) of a computing device. Browser-based application 105 may be written in any programming language for deployment on a browser, such as HTML, Javascript, and the like. Web browser 120, in turn, may be any web browser for execution on a computing platform of computing device, such as computing device 115. In one example embodiment, web browser 120 may be a Safari® browser designed to run in an Apple OS X® environment and available from Apple, Inc. While web browser 120 may be limited to the computing platform or software environment that computing device 115 operates in, browser-based application 105 is developed to be deployed on any type of browser on computing device 115.

Native application 110 may be any application running in the background of computing device 115 or more particularly, executing on an operating system thereof. Native application 110 may be written in any programming language appropriate for the computing platform of computing device 115. For example, native application 110 may be designed to run in a Microsoft Windows® (available from Microsoft Corporation) an Apple OS X® (available from Apple, Inc.) or an Android® (available from Google, Inc.) operating system environment, depending upon the operating system running on computing device 115. Native application 110 may be embedded in and/or hosted by other applications locally operating on computing device 115.

In one example embodiment, native application 110 may refer to a collection of native applications locally operating on the operating system of computing device 115. Two native applications 110 may not be able to directly communicate or share data with each other and may not share any code or variables. As such, a native application 110A and a native application 110B may be operating independently from each other and may each perform their respective functions and/or operations on computing device 115.

Each native application 110 may be connected to a network such as the web and/or other computing devices on system 100. Each native application 110 may be connected to memory 125 of the computing device for storing resources associated therewith. As will be known in the art, memory 125 may consist of system-specific or application-specific resources. Thus, memory 125 may be divided into different portions. For example, respective portions may be allocated for data associated with each native application 110. In another aspect, memory 125 may employ one or more data structures for organizing local resources 130 stored thereon. Memory 125 in this context may be a collection of various types of data stored in an organized manner.

Computing device 115 may be, for example, a personal computer, a laptop computer, a workstation computer. In some example aspects, computing device 115 may be a handheld or pocket-sized mobile or portable device such as, for example, a mobile telephone, a smart phone, a personal digital assistant, a tablet computer, an e-book reader, or other similar device. While each native application 110 is independent of another native application 110 on computing device 115, an application component 140 may be installed on computing device 115 so each native application 110 may be able to communicate.

Application component 140 is comprised of a set of instructions for execution on computing device 115. In one aspect, application component 140 is developed to communicate with native applications 110 on computing device 115. In one example embodiment, application component 140 may be operative to listen to events on a first predetermined native application 110 but not on another native application 110. For example, application component 140 may be configured to detect or listen to events from one or more instances of one or more types of applications running on computing device 115. In yet another example embodiment, application component 140 may be operative to detect preset events on one or more native applications 110. For example, application component 140 may be configured to detect or listen to text input events in all applications on computing device 115.

Application component 140 is developed to communicate with memory 125 for one or more resources. Application component 140 may also be developed to write data or to store resources in memory 125. In this regard, application component 140 may be a listening and/or a writing component on computing device 115. Prior to execution on computing device 115, application component 140 may be stored in another storage medium, such as on web server 135.

Establishing application component 140 on computing device 115 may include loading a browser-based application 105 on web browser 120 on computing device 115, such that a connection between one or more native applications 110 and browser-based application 105 is established upon execution of the latter in web browser 120. In another example embodiment, application component 140 may be executed via a downloadable link on web browser 120.

Browser-based application 105 may be connected to a web server 135. Web server 135 may be a single or a collection of servers. In some example aspects, web server 135 may utilize one or more databases, and/or other storage mechanisms (i.e., other computing devices) storing a plurality of resources. Browser-based application 105 may be communicatively coupled to web server 135 over a network. In one example embodiment, browser-based application 105 may be a web application from web server 135 per request by a user of web browser 120, such as a web page.

With continuing reference to FIG. 1, web server 135 has stored thereon program instructions illustrated as code 145 for execution on web browser 120. In one example embodiment, code 145 may be requested by web browser 120. In another example embodiment, code 145 may be automatically sent to computing device 115 upon execution of browser-based application 105 on the web browser 120. Executing code 145 on web browser 120 enables creation of application component 140 on computing device 115, thus enabling local communications between browser-based application 105 and computing device 115. How browser-based application 105 and/or web browser 120 now behaves on computing device 115 upon creation of application component 140 will be discussed in detail below.

Figure 2:
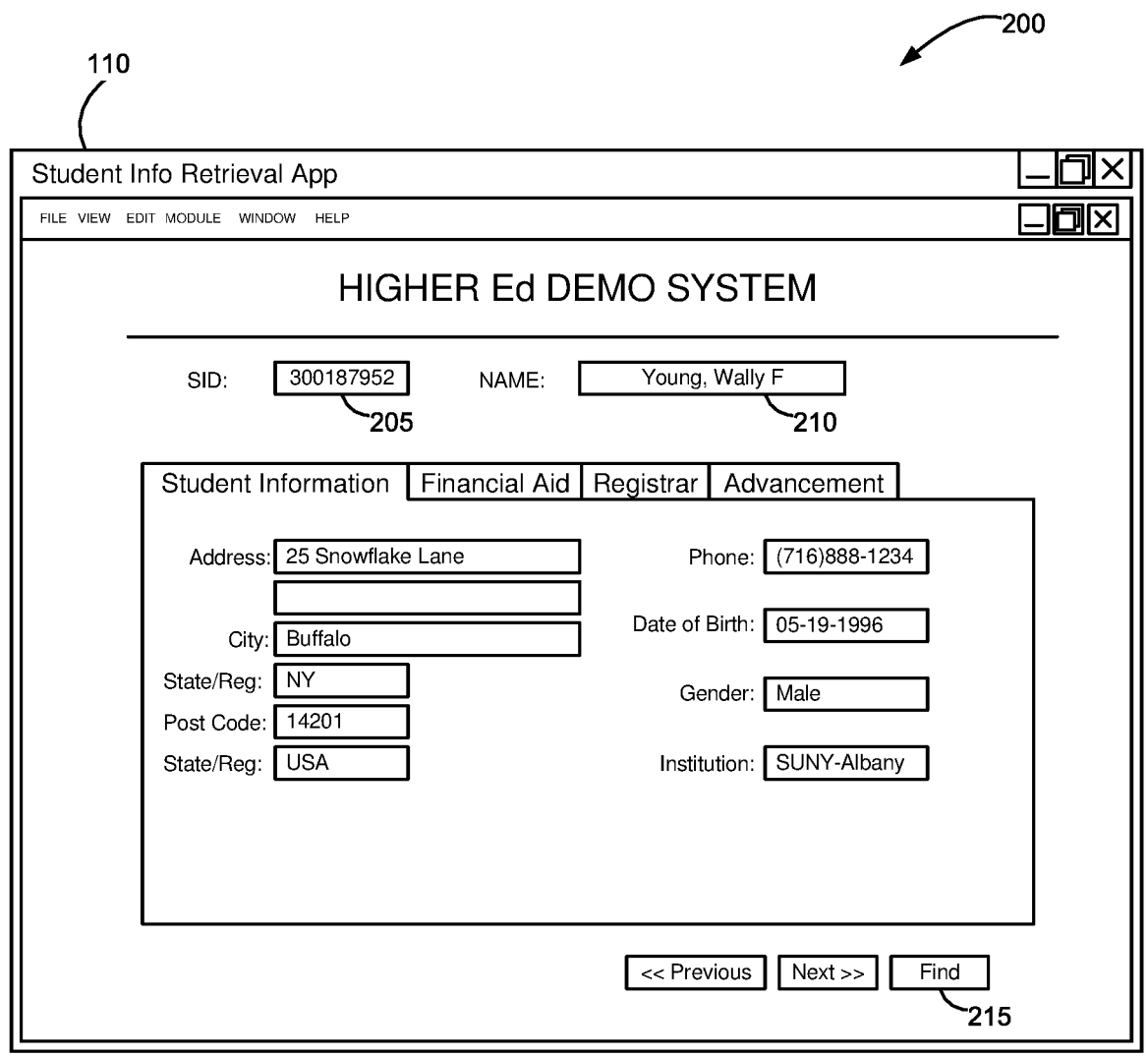
FIG. 2 shows one example embodiment of an application installed and for execution on a computing device.

FIG. 2 shows one example embodiment of a native application 110. In this example embodiment, native application 110 may be a student information retrieval application 200 for running on computing device 115. Student information retrieval application 200 may include a plurality of text fields primarily comprising Student ID field 205 and Name field 210. Native application 110 further includes a Find button 215 operative to be clicked or depressed by a user of computing device 115 to activate a search for one or more resources associated with the data entered on Student ID field 205 and Name field 210.

Figure 3:
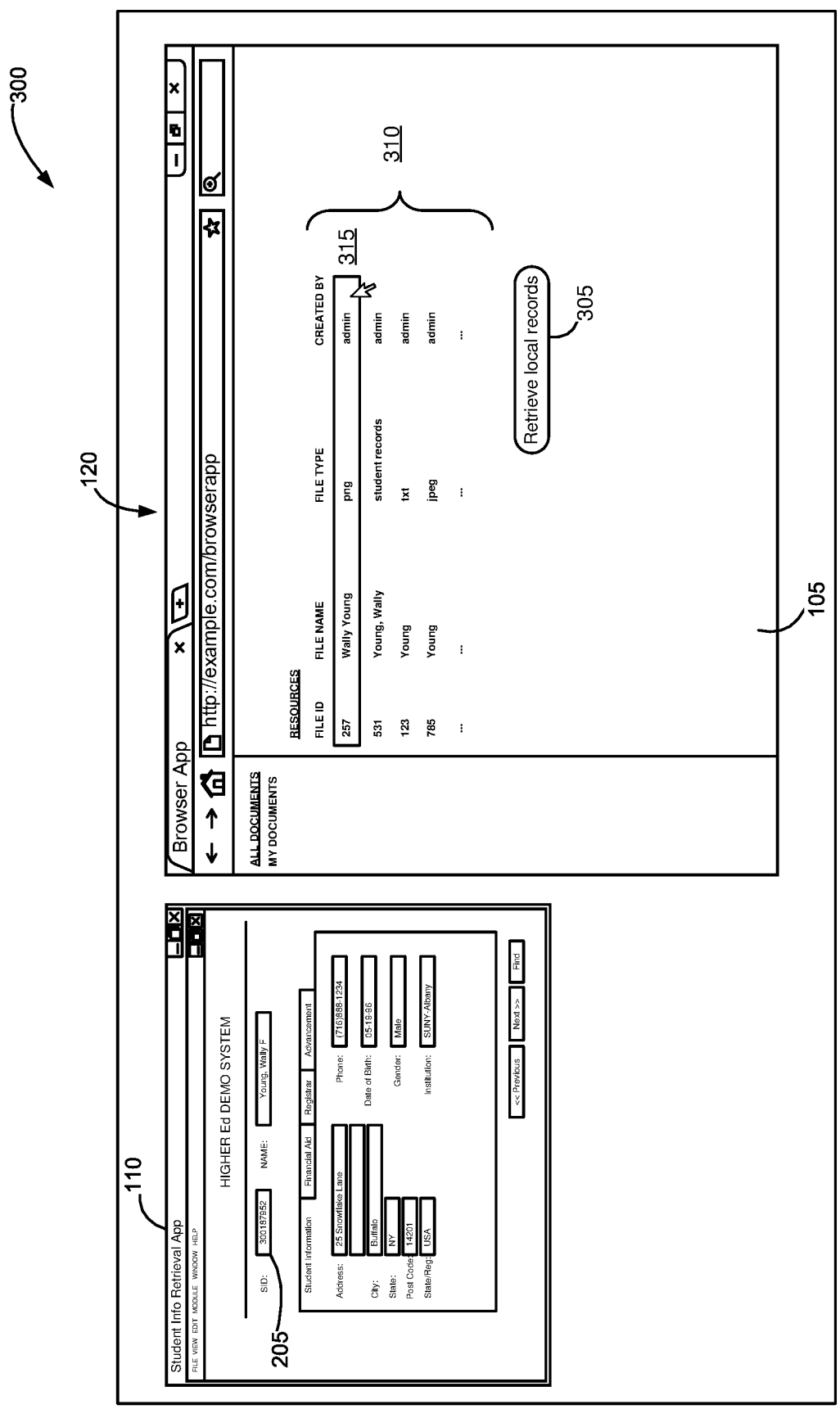
FIG. 3 shows an example screenshot view of the system in FIG. 1.
Figure 4:
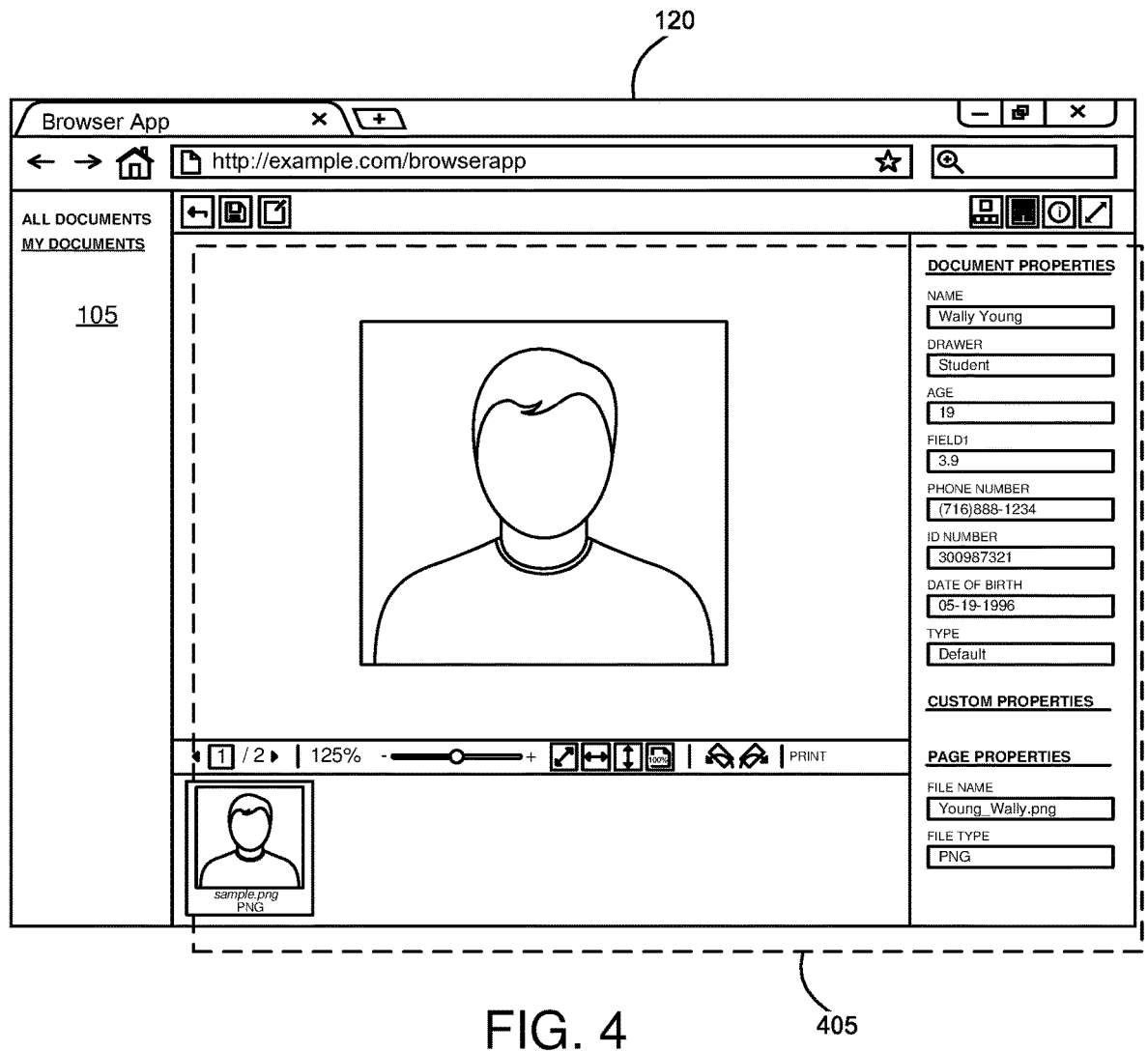
FIG. 4 shows one example embodiment of a browser-based application for connection to local applications.

FIG. 3 highlights a screenshot view 300 of computing device 115 which includes native application 110 (in this example, student information retrieval application 200 from FIG. 2) and browser-based application 105. FIG. 4 shows one example embodiment of a browser-based application 105 as executed on a web browser 120. In FIG. 4, browser-based application 105 shows a display of a particular resource that is associated with an event from the native application in FIG. 2 and as selected by the user from FIG. 3. It is to be noted that the examples shown on FIGS. 2-4 are illustrated by way of examples only. How the aforementioned applications interact in the present disclosure will now be discussed in FIGS. 5A and 5B.

Figure 5A:
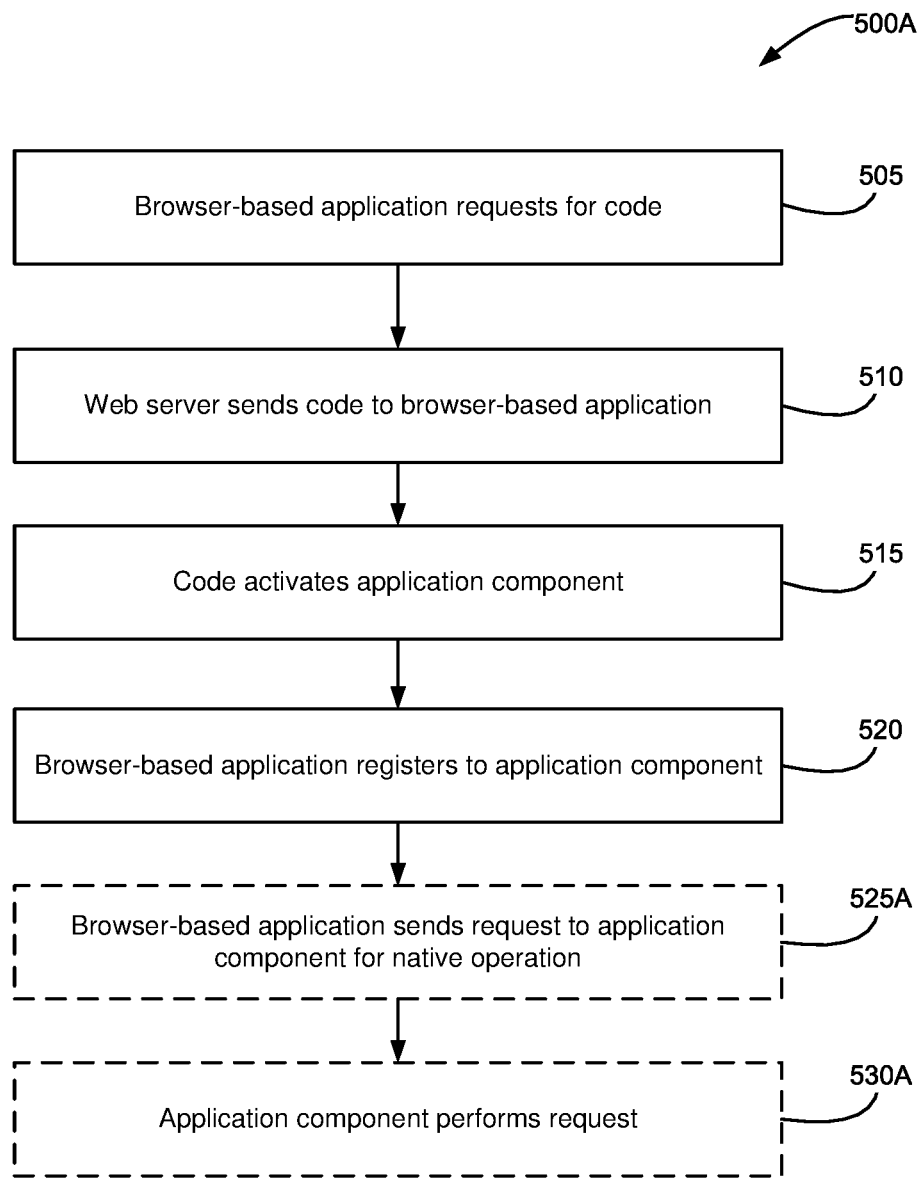
FIGS. 5A AND 5B show example flowcharts of a method of presenting resources associated with either an application locally operating on a computing device and a browser-based application in the example system of FIG. 1
Figure 5B:
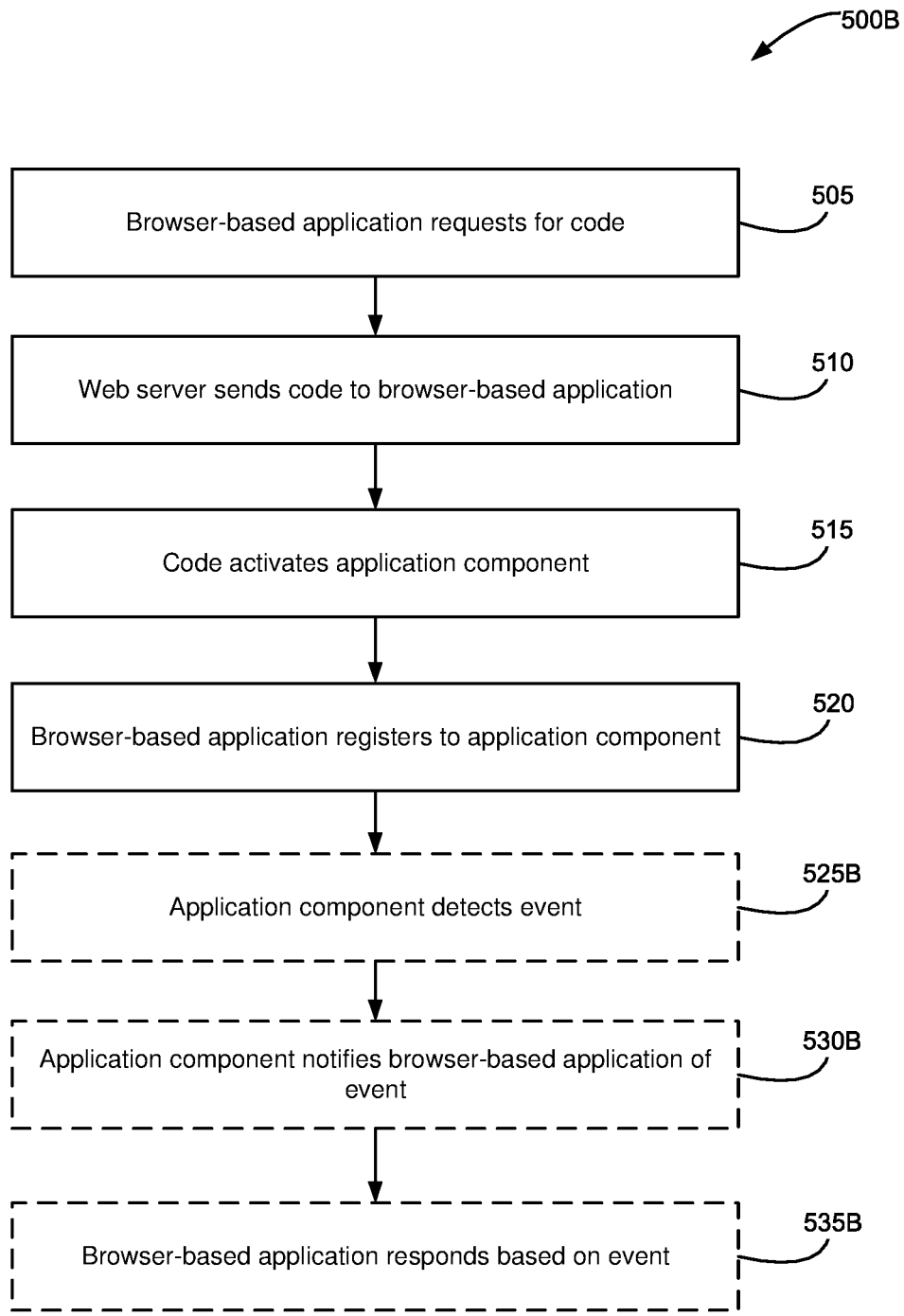

FIGS. 5A and 5B detail the steps in extending functionality of web browser 120 to include providing access to resources that may be stored on one of computing device 115 and/or on web server 135 to the other. FIG. 5A is directed to the steps of enabling web browser 120 to perform native or local operations on computing device 115 (native functionality). FIG. 5B is directed to the steps of enabling web browser 120 to synchronize local and/or remote resources. It is to be noted that the first four steps on FIGS. 5A and 5B are identical as these steps are directed to the establishment of the connection between any native application 110 on the computing device and browser-based application 105.

At block 505, browser-based application 105 requests for code 145 from web server 135. As aforementioned, code 145 is a set of program instructions that enables browser-based application 105 to connect with any native application 110. In one example embodiment, code 145 may be a web page for loading on web browser 120. Requesting for code 145 may be performed by selection of an interface component on browser-based application 105 (i.e., button, download link), typing an address on the browser address bar, or other known methods for requesting web applications. Alternatively, code 145 may be requested simultaneously with the execution of browser-based application 105.

At block 510, web server 135 sends code 145 to the web browser 120 for execution. At block 515, upon such receipt of code 145 by web browser 120, code 145 activates application component 140 on computing device 115. At block 520, browser-based application 105 registers to application component 140 for any events detected thereby. In one example embodiment, upon activation of code 145, an interactive communication between browser-based application 105 and application component 140 is established such that browser-based application 105 is immediately notified of any event detected on any native application 110 by application component 140 without the browser-based application 105 requesting to do so. In one aspect, the activation of code 145 on the computing device enables a WebSocket communication between browser-based application 105 and application component 140.

The installation of application component 140 may enable a two-way communication between browser-based application 105 and native application 110. In one example embodiment, while browser-based application 105 is operative to receive messages from application component 140, the browser-based application 105 can also send messages and/or requests to application component 140. In one aspect, such a request may be aimed at particular native applications 110 on computing device 115 or to data on computing device 115. The request may be in the form of a message.

In one example embodiment, a connection between browser-based application 105 and a native application 110 may be established only when it has been determined that said native application 110 is in an active state on computing device 115. In this example, upon execution of browser-based application 105 at block 505, it is consequently determined whether a predetermined native application 110 is currently executing on computing device 115 prior to establishing the connection. Upon an affirmative determination, a connection may be established between the browser-based application 105 and predetermined native application 110. In other example embodiments, a connection may be later established between the browser-based application 105 and the predetermined native application 110 when native application 110 is executed. In some example aspects, the connection between the browser-based application 105 and the predetermined native application 110 may be a WebSocket communication. In other example aspects, the connection may be achieved by repeated client-server polling. In yet other example aspects, the connection may be achieved by a plug-in specifically designed to facilitate a proprietary communication protocol.

With reference on FIG. 5A, following installation of application component 140, browser-based application 105 may send a request to application component 140 to perform a native operation (block 525A). A native operation may refer to functions that are typically performed by native or locally running applications, such as, for example, storing data or accessing resources on memory 125. In one example embodiment, browser-based application 105, using its connection with application component 140 may send a request to memory 125 for one or more resources. As such, sending a request may include sending an identifier of a resource for accessing on memory 125 or an identifier of a native operation to be performed. For example, browser-based application 105 may request for one or more records that are associated with a student username "Young" from the device memory 125. At block 530A, application component 140 may perform one or more actions associated with such request from browser-based application 105. In the same example, application component 140 may retrieve said one or more resources from memory 125 and sends these records to browser-based application 105 for display thereon.

In FIG. 3, browser-based application 105 may include a button 305 ("Retrieve local records" button 305) which may allow browser-based application 105 to send a request to application component 140 for said component to retrieve other records associated with an event on native application 110. In the same example, button 305 may be used to retrieve other records associated with an entry on Student ID field 205 on native application 110. Other systems or embodiments allowing browser-based application 105 to send requests to application component 140 in the background of computing device 115 will be apparent in the art.

With application component 140 running on computing device 115, browser-based application 105 is operative to be aware of events on native application 110, as will be detailed by steps 525B-535B on FIG. 5B. At block 525B, application component 140 detects an event on native application 110. In one aspect, the detected event and/or the native application 110 may be predetermined. For example, browser-based application 105 may be registered (at block 520) to application component 140 as a listener for any student identifier input events on student information system 200. With reference back to FIG. 2, a student identifier may be detected to be inputted on Student ID field 205.

Upon such detection, application component 140 may then notify browser-based application 105 of the event (block 530B). Notifying browser-based application 105 may include sending (by application component 140) a message to browser-based application 105 indicating the detected event. A message may be in the form of a document including content associated with the detected event. In the same example for block 525B, at FIG. 2, application component 140 may retrieve the student identifier on Student ID field 205 and include this in a message to browser-based application 105.

At block 535B, browser-based application 105 may respond to the detected event based upon the message. Responding to an event detected on native application 110 by application component 140 may be in the form of displaying resources that are associated with the detected event. Upon notification of a student identifier input on Student ID field 205 of the student info retrieval application 200 (FIG. 2), for example, browser-based application 105 may retrieve one or more resources (i.e., student records) associated with the student identifier. As such, retrieval of the one or more records may include, but are not limited to, extraction of the student identifier from the message, communicating with web server 135 for resources associated with such identifier, collecting associated resources stored on memory 125, and the like. How browser-based application 105 may respond to a detected event on native application 110 or on computing device 115 may be preset.

Back on FIG. 3, a plurality of resources retrieved from web server 135 may be indicated as a plurality of entries 310. Each of the plurality of entries 310 may be selectable by a user of computing device 110. In one example embodiment, each entry may be a link. For example, the user of computing device 110 may select the first entry thereon (indicated as boxed entry 315). Upon such selection, other information relating to the selected entry may be rendered on the interface of browser-based application 105, such as the metadata information indicated in dotted box 405. To this end, applications on web browser 120—using its connection with application component 140—may be able to have automated access to one or more local resources associated with events detected on native application 110, regardless of the programming languages or frameworks of the applications involved. Accordingly, local events may be communicated to applications on web browser 120 via application component 140.

It will be appreciated that the actions described and shown in the example flowcharts may be carried out or performed in any suitable order. It will also be appreciated that not all of the actions described in FIGS. 5A and 5B need to be performed in accordance with the example embodiments and/or additional actions may be performed in accordance with other example embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of accessing a resource stored in a memory of a computing device, comprising:
   requesting, by a web application and from a web server, code for configuring the web application to connect with a native application active on a computing device, wherein the code causes the creation of an application component on the computing device, the application component executes outside of a web browser running on the computing device;
   subsequent to the application component configuring the web application to connect with the native application, loading the web application into the web browser;
   determining, by the application component, whether the native application is active on the computing device;
   in response to determining the native application is active, establishing, by way of the application component, a connection between the web application and the native application, wherein the application component monitors the native application for events that occur on the native application;
   responsive to the application component detecting that an event has occurred on the native application, sending, by the web application to the application component, a request comprising an indication of a native operation to be performed by the native application, wherein the request comprises at least one of an identifier of the resource stored in the memory of the computing device or an identifier of the native operation, wherein the resource comprises a resource from at least one of a file system of the computing device that is accessible by the native application, a process performed by the native application running on the computing device, or a list of users logged onto the computing device, wherein the list of users is accessible by the native application; and
   performing, by the application component, an action associated with the request, wherein the action comprises at least one of retrieving the resource stored in the memory of the computing device or causing the native operation to be performed by the native application.

2. The method of claim 1, wherein the native application comprises an application running in a background of the computing device.

3. The method of claim 1, wherein the resource is associated with the event on the computing device.

4. The method of claim 3, wherein the event is at least one of a dropped network connection, an additional user accessing the computing device, an occurrence of application failure, or a change of state of a third application running on the computing device.

5. The method of claim 1, wherein the determining comprises determining whether a communication channel can be established between the web application and the native application.

6. The method of claim 1, further comprising:
displaying, on a display, the resource.

7. A method of syncing events between a native application and a browser application running on a computing device, wherein the browser application runs in a web browser on the computing device, the method comprising:
loading a background service on the computing device, the background service being communicatively connected with the browser application and the native application, wherein the background service executes outside of the web browser, wherein the background service monitors the native application for events that occur on the native application;
responsive to the background service detecting that an event has occurred on the native application, receiving, by the browser application, a message from the background service indicative of the event that occurred on the native application, wherein the message comprises a document including content associated with the event; and
responsive to receiving the message, performing, by the web browser, one or more operations associated with the event, wherein the one or more operations comprise:
retrieving one or more resources associated with the event, wherein the one or more resources comprise a first resource from at least one of a file system of the computing device that is accessible by the native application, a first process performed by the native application running on the computing device, or a first list of users logged onto the computing device, wherein the first list of users is accessible by the native application;
extracting at least one identifier from the one or more retrieved resources;
determining one or more additional resources associated with the identifier; and
retrieving the one or more additional resources, wherein the one or more additional resources comprise a second resource from at least one of the file system of the computing device that is accessible by the native application, a second process performed by the native application running on the computing device, or a second list of users logged onto the computing device, wherein the second list of users is accessible by the native application.

8. The method of claim 7, wherein the loading includes determining whether the native application is executing on the computing device and upon a positive determination, establishing, by the background service, a connection between the browser application and the native application.

9. The method of claim 8, wherein the connection is established when the native application is later executed.

10. The method of claim 7, wherein the event comprises: a request for a resource stored in a memory of the computing device, a request for the native application to perform a native operation, or both the request for the resource and the request for the native application to perform the native operation.

11. The method of claim 7, wherein at least one of the first resource or the second resource is associated with the native application.

12. The method of claim 7, further comprising displaying a result of the one or more operations on an interface of at least one of: the browser application or the native application.

13. The method of claim 7, wherein the one or more additional resources are hosted by a remote web server, wherein the one or more operations further comprise requesting the one or more additional resources from the remote web server.

14. A computing device for syncing events between a native application and a browser application running on the computing device, wherein the browser application runs in a web browser on the computing device, comprising:
a processor; and
memory storing instructions that, when executed by the processor, cause the processor to perform acts comprising:
loading a background service on the computing device, the background service being communicatively connected with the browser application and the native application, wherein the background service executes outside of the web browser, wherein the background service monitors the native application for events that occur on the native application;
responsive to the background service detecting that an event has occurred on the native application, receiving, by the browser application, a message from the background service indicative of the event that occurred on the native application, wherein the message comprises a document including content associated with the event; and
responsive to receiving the message, performing, by the web browser, one or more operations associated with the event, wherein the one or more operations comprise:
retrieving one or more resources associated with the event, wherein the one or more resources comprise a first resource from at least one of a file system of the computing device that is accessible by the native application, a first process performed by the native application running on the computing device, or a first list of users logged onto the computing device, wherein the first list of users is accessible by the native application;
extracting at least one identifier from the one or more retrieved resources;
determining one or more additional resources associated with the identifier; and
retrieving the one or more additional resources, wherein the one or more additional resources comprise a second resource from at least one of the file system of the computing device that is accessible by the native application, a second process performed by the native application running on the computing device, or a second list of users logged onto the computing device, wherein the second list of users is accessible by the native application.

15. The computing device of claim 14, wherein the loading includes determining whether the native application is executing on the computing device and upon a positive determination, establishing, by the background service, a connection between the browser application and the native application.

16. The computing device of claim 15, wherein the connection is established when the native application is later executed.

17. The computing device of claim 14, wherein the event comprises: a request for a resource stored in a memory of the computing device, a request for the native application to perform a native operation, or both the request for the resource and the request for the native application to perform the native operation.

18. The computing device of claim 14, wherein at least one of the first resource or the second resource is associated with the native application.

19. The computing device of claim 14, further comprising displaying a result of the one or more operations on an interface of at least one of: the browser application or the native application.

20. The computing device of claim 14, wherein the one or more additional resources are hosted by a remote web server, wherein the one or more operations further comprise requesting the one or more additional resources from the remote web server.

* * * * *